(12) United States Patent
Rippel et al.

(10) Patent No.: US 7,952,022 B2
(45) Date of Patent: May 31, 2011

(54) DUAL ACCESS LUMINAIRE JUNCTION BOX

(75) Inventors: Graham M. Rippel, Walpole, MA (US); John S. Park, Fall River, MA (US); Eugene R. Sartini, Fall River, MA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 215 days.

(21) Appl. No.: 12/371,774

(22) Filed: Feb. 16, 2009

(65) Prior Publication Data

US 2010/0224404 A1    Sep. 9, 2010

(51) Int. Cl.
*H05K 5/00*    (2006.01)

(52) U.S. Cl. .............. 174/50; 174/58; 174/63; 362/365; 439/535; 248/906; 248/343

(58) Field of Classification Search .................... 174/50, 174/63, 58; 248/57, 323, 343, 906; 362/148, 362/365; 200/297; 439/535; 220/4.02
See application file for complete search history.

(56) References Cited

U.S. PATENT DOCUMENTS

| | | | | |
|---|---|---|---|---|
| 4,336,575 A | * | 6/1982 | Gilman | 362/147 |
| 5,938,157 A | * | 8/1999 | Reiker | 248/200.1 |
| 6,768,071 B1 | * | 7/2004 | Gretz | 200/297 |
| 7,297,870 B1 | * | 11/2007 | Sartini | 174/50 |

* cited by examiner

*Primary Examiner* — Dhiru R Patel (57) ABSTRACT

The present invention relates to a junction box for a use with a recessed luminaire fixture frame wherein the junction box may be accessed from two opposed sides, eliminating the need to move the fixture to access and inspect the junction box.

19 Claims, 12 Drawing Sheets

DUAL ACCESS LUMINAIRE JUNCTION BOX

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC

None.

BACKGROUND

1. Field of the Invention

The present invention pertains to a recessed luminaire fixture. More particularly, the present invention pertains to a junction box for a use with a recessed luminaire fixture frame wherein the junction box may be accessed from two opposed sides eliminating the need to move the fixture to access and inspect a junction box.

2. Description of the Related Art

Recessed downlights have become increasingly popular in both commercial and residential construction due to their ability to meet a wide range of interior lighting requirements, as well as the aesthetically pleasing nature of the fixtures themselves. Typically, ceiling mounted recessed light fixtures comprise a frame or frame-in kit with hanger bars which extend between structural supports of the ceiling. For example, structural supports may be ceiling joists or suspended ceiling grid members. The fixture frame retains the fixture, reflector, reflector trim, lamp, ballast, junction box and other components in position above the ceiling and between the ceiling structural supports. Once installed between ceiling structural supports, ceiling material, such as dry wall or plaster board for example, is positioned over the fixture. A hole is cut in the ceiling material so that light output is available from above the ceiling level, hence the name recessed downlight.

Ceiling structural supports are spaced apart which allows positioning of the light fixtures there between. The fixture or frame-in kit may also have a junction box or housing disposed at one end. The recessed luminaire fixtures including the junction box generally define some shape or footprint. During installation of multiple fixtures, the light output apertures of these fixtures are aligned. However, during alignment of the output apertures, the junction box or housing is positioned on the frame so that the junction box may interfere with the ceiling structural supports of a certain center-to-center spacing dimension. This is undesirable and may even inhibit the frame-in kit from being positioned between the ceiling structural supports and/or being aligned with other recessed fixtures.

Additionally, with junction boxes positioned on an outside of the housing, the box may be positioned against various structures within the ceiling. For example, in commercial building and some residential structures, the space above the ceiling may comprise heating ventilation and air-conditioning (HVAC) equipment. Additionally, the ceiling space may comprise electrical tray for runs of wire, or alternatively may comprise wiring conduit. Further, the ceiling space may comprise plumbing equipment as well as insulation. Thus, a junction box may abut or interfere with any of these in-ceiling structures.

When buildings are inspected by electrical inspectors, the inspections typically require access to the recessed fixture frame junction boxes. During installation of the recessed luminaires, the fixtures are typically positioned according to a specific lay-out which provides desirable lighting characteristics. In many installations however, the junction box is positioned closely to ceiling support structures. Typically the junction boxes are positioned in a substantially vertical orientation, meaning the doors are positioned in a substantially vertical plane in the closed position. When the vertically oriented junction box is positioned closely to the ceiling supports or other in-ceiling structure, the ceiling supports or other in-ceiling structure may interfere with opening of the junction box after wiring connections are made. Consequently, when an inspector requires inspection of a junction box which is positioned closely to a ceiling support structure, prior art fixtures and junction box housing must be moved from the preselected position proper for the desirable for spacing, presentation, and lighting characteristic. Similarly, above ceiling level and adjacent to the recessed fixture, HVAC and/or plumbing components also hinder opening of prior art junction boxes.

Additionally, at the time of many of these inspections, typically the insulation surrounding the fixture is already installed. With prior art recessed fixtures, insulation in the area of at least the junction box must be removed in order to access the junction box doors and inspect wiring connections. Removal of insulation is undesirable as it requires duplicative work by contractors. Similarly, the movement of the fixture from a selected location to access the junction box is also undesirable because not only is it duplicative, but the lights are precisely positioned for a preselected spacing and pattern. Movement from this position affects the lighting pattern as a whole.

Given the foregoing deficiencies, it should be appreciated that a recessed lighting fixture is needed which allows visible access to the junction box in tight quarters without requiring movement of the light fixture.

SUMMARY OF THE INVENTION

A recessed fixture having a junction box positioned adjacent at least one ceiling support structure comprises a recessed luminaire fixture, the junction box mounted to the recessed luminaire frame, the junction box being horizontally oriented, the junction box having a first facing junction box door and a second junction box door, the first junction box door and the second junction box door being oppositely positioned and pivotally connected to a junction box housing, the first and second junction doors being in a substantially horizontal orientation in a closed position, one of the first junction box door and the second junction box door facing substantially upwardly and the other of the first junction box door and the second junction box door facing substantially downwardly, wherein the horizontal orientation allows the junction box doors to be positioned adjacent a ceiling structure without limiting opening of the junction box doors. The recessed fixture wherein the first junction box door has a first pivoting axis extending horizontally. The recessed fixture wherein the second junction box door has a second pivoting axis extending in a direction substantially parallel to the first pivoting axis. The recessed fixture wherein the junction box housing has a sidewall disposed between the first and second junction box doors and adjacent the at least one ceiling support structure. The recessed fixture wherein the sidewall disposed between the first and second junction box doors and adjacent the at least one ceiling support structure being a substantially vertical sidewall. The recessed fixture wherein the junction box doors are openable without requiring movement of the fixture relative to the at least one ceiling support structure.

A recessed fixture having a junction box comprises a recessed fixture having a light output aperture, the junction box mounted to the recessed fixture, a first access door pivotally mounted on the junction box in a first substantially horizontal plane, a second access door pivotally mounted to the junction box, the second access door positioned opposite the first access door in a second substantially horizontal plane, the first and second substantially horizontal planes being substantially parallel to a plane of the light output aperture, the junction box being positioned adjacent a ceiling support structure, the first access door and the second access door being openable when the junction box is positioned immediately adjacent the ceiling support structure and without moving the fixture frame. The recessed fixture wherein the first and second access doors are pivotable about a horizontal axis. The recessed fixture further comprising an access plate fastened to the junction box. The recessed fixture wherein the access plate provides access to the junction box internally from the fixture housing. The recessed fixture further comprises an electrical component mounted to the access plate. The recessed fixture further comprises a clip for retaining the first and second access doors in a closed position. The recessed fixture further comprises a plate covering an aperture between the junction box and a housing of the recessed fixture. The recessed fixture further comprises an electrical component connected to the plate.

A recessed fixture assembly having a junction box comprises the junction box extending from a sidewall of the recessed luminaire fixture, at least one opening disposed between the junction box and the recessed luminaire fixture, the opening allowing interior access to the junction box through the recessed luminaire fixture, a first pivoting door and a second pivoting door oppositely positioned on the junction box and horizontally oriented in the closed position, the junction box being horizontally oriented so that the junction box doors are accessible when the junction box is positioned adjacent a ceiling support member. The recessed fixture further comprises pivot apertures in vertically oriented junction box sidewalls. The recessed fixture wherein the recessed luminaire fixture is an enclosed fixture. The recessed fixture further comprising a plate covering the opening allowing interior access to the junction box. The recessed fixture further comprising an electrical component connected to the plate, the ballast positioned within an interior of the junction box.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Furthermore, and as described in subsequent paragraphs, the specific mechanical configurations illustrated in the drawings are intended to exemplify embodiments of the invention and that other alternative mechanical configurations are possible.

Referring now in detail to the drawings, wherein like numerals indicate like elements throughout the several views, there are shown in FIGS. 1-12 various aspects of a recessed light fixture having a dual door junction box. The junction box doors allow for easy access without moving the fixture frame from a fixed position away from a ceiling support or any other in-ceiling structure during inspection of the wiring connections by an inspector. The junction box doors further allow access to the junction box without requiring movement of the insulation surrounding the fixture frame during inspection of the wiring connections by an inspector. Further, the junction box allows for internal access through the light output aperture once the fixture frame is enclosed by the ceiling material. The junction box allows access for any reason, for example if maintenance is required, and additionally allows access from above the fixture if the ceiling is a permanent non-movable type. In such construction, where the trim would normally have to be removed and the fixture moved, the instant junction box provides for access from above the fixture, for example from an attic. This eliminates the need for trim removal and movement of the fixture.

Figure 1:
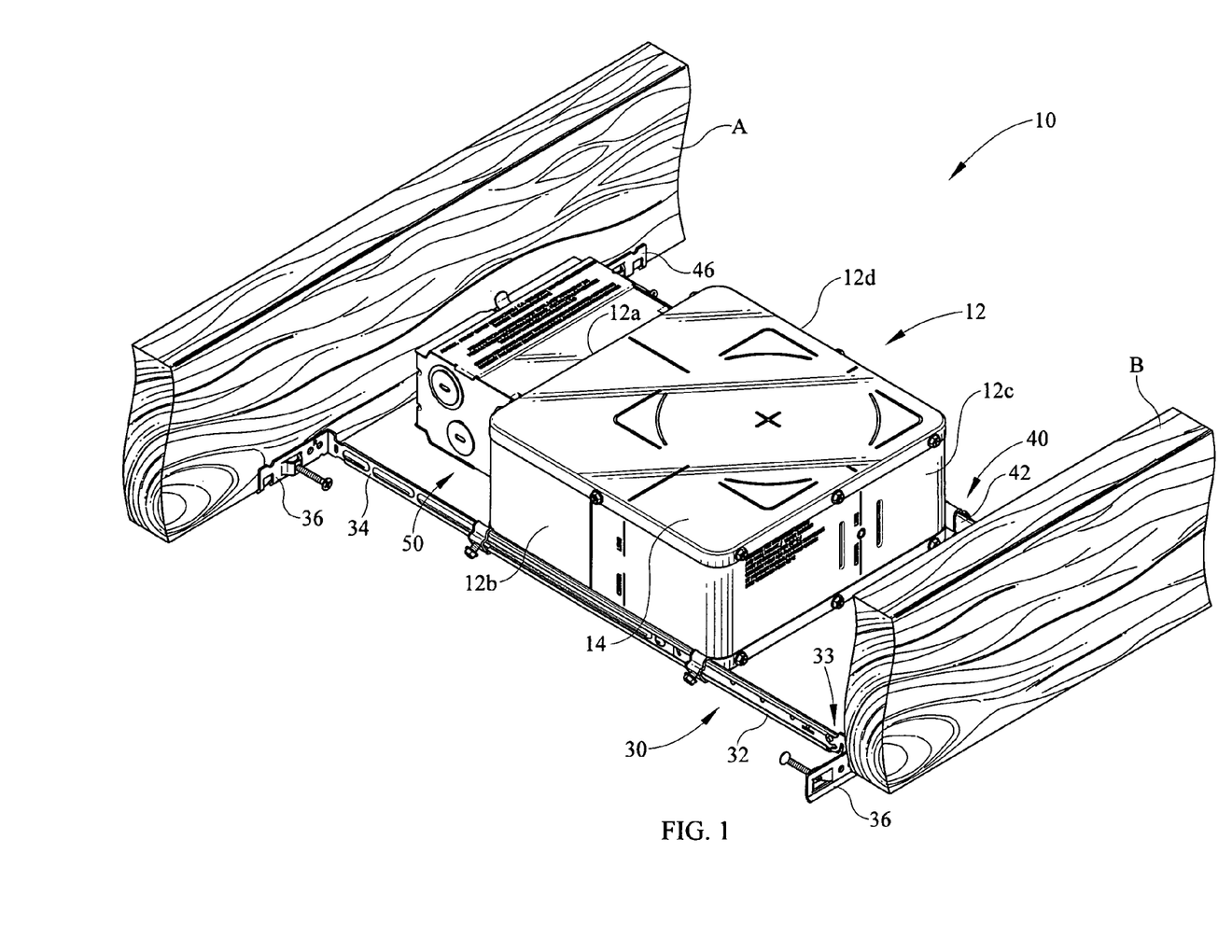
FIG. 1 is a perspective view of a fixture frame-in kit positioned between ceiling support structures in a first orientation.

Referring initially to FIG. 1, the fixture frame-in kit 10 is shown positioned between a first support structure A and a second support structure B in an installed position. The support structures A, B are depicted as wooden joists. However, alternate structures are well within the scope of the present embodiment wherein such support structures may be defined by suspended ceiling grid members, support structures of alternate materials or alternate structural shapes or systems. While the present invention is generally described with respect to ceiling applications, the present fixture and junction box may also be utilized in walls in a sconce-like application and therefore should not be considered limited to ceiling applications.

The fixture 10 comprises a fixture housing 12. In the depicted embodiment the housing 12 is generally square in shape having four sides, 12a, 12b, 12c, and 12d as well as an upper surface 14 and a lower surface 16 (FIG. 2) defining the housing 12. It should be understood by one of ordinary skill in the art that the enclosed housing 12 is exemplary as alternatively a frame or pan may be utilized and the depicted embodiment of the housing 12 should not be limited to enclosed-type housings. For example, in the alternative a frame-arm type of assembly or a frame pan with or without a recessed can could be used.

Figure 3:
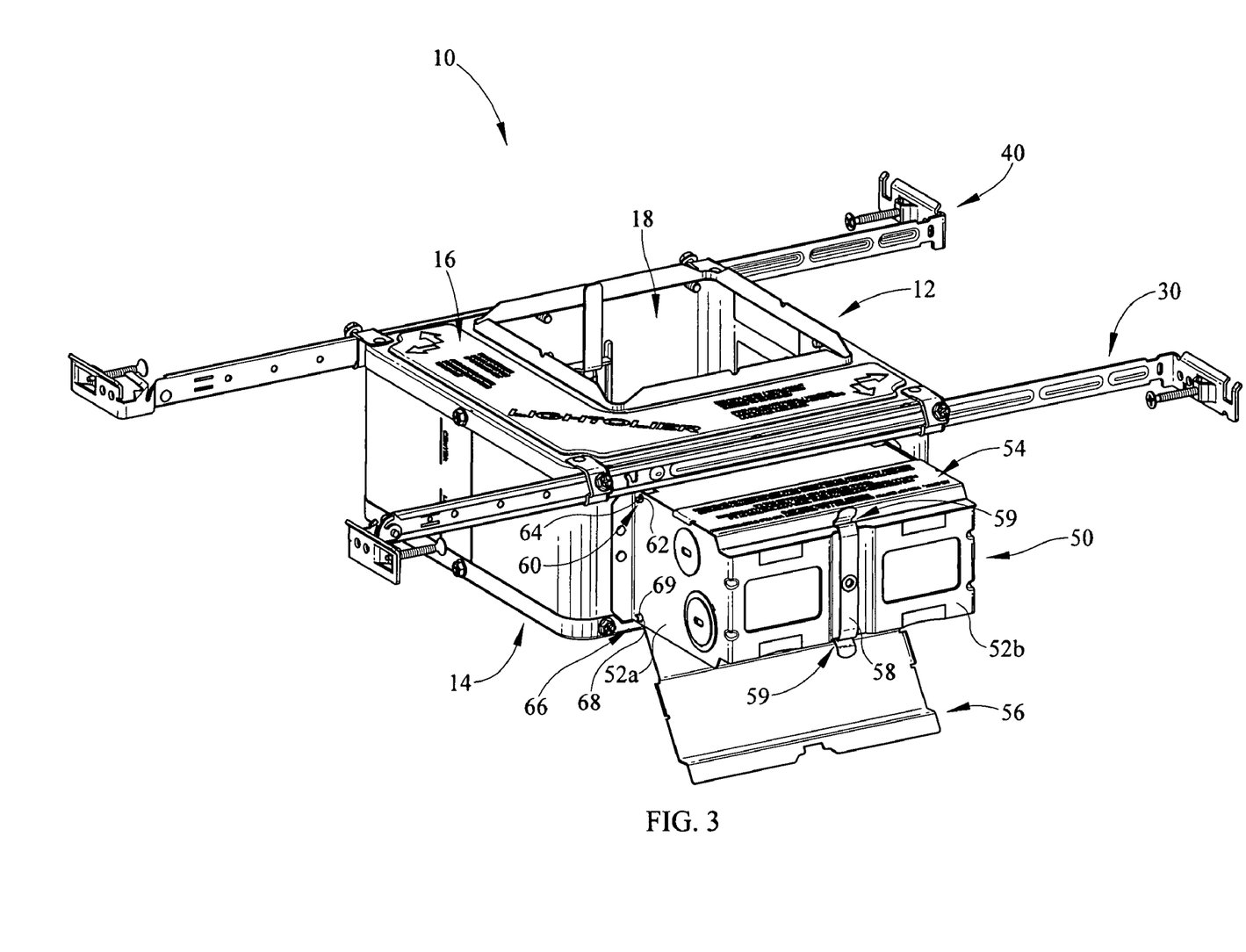
FIG. 3 is a perspective view of the fixture frame-in kit of FIG. 2 with a second junction box door open.

Also, depicted in FIG. 1 is a junction box or housing 50. The junction box 50 provides an enclosure for wiring connections and/or an enclosure for electrical components such as, for example, a ballast used with fluorescent lighting, a transformer used with low voltage lighting or a power supply unit or driver used with LED lighting. These are merely exemplary structures and should not be considered limiting. Despite the exemplary housing 12 being substantially square in shape, the junction box 50, in combination with the attached housing 12 form a generally rectangular envelope or footprint. The housing 50 is shown mounted to the side wall 12a of the fixture housing 12 and positioned adjacent support structure A. Alternatively however, the junction housing 50 could be positioned adjacent support structure B. In either event, the orientation of the fixture 10 is such that the junction housing 50 is adjacent one of the support structures A, B. Referring briefly to FIG. 3, the lower surface 16 of the housing 12 comprises an aperture 18 for light output. These apertures are typically aligned within a room or space to achieve desired layout/placement as well as aesthetically pleasing appearance from below the fixture. However, in aligning the multiple fixtures and providing proper spacing, the junction box 50 may interfere with the ceiling supports or other in-ceiling structure inhibiting proper alignment of multiple apertures 18 amongst multiple fixtures.

Also shown in FIG. 1 are first and second hanger bar assemblies 30, 40. Each of the hanger bar assemblies 30, 40 comprises a first hanger bar channel 32, 42 and a slidable portion 34, 44 slidably positioned within the channel 32, 42. The term channel should not be considered a limiting term as the first hanger bar portions 32, 42 may be defined by alternate structural shapes which will receive the second portions 34, 44. Moreover, the hanger bar assemblies 30, 40 alternatively may each be defined by one-piece hanger bars or bars of three or more pieces. At each end of the hanger bar assemblies 30, 40 are feet 36, 46. The feet 36, 46 allow the hanger bar assemblies 30, 40 to be attached to the support structures A, B. In the embodiment depicted, the feet 36, 46 are fastened to the joist structures A, B. However, the hanger bars assemblies 30, 40 may be connected to suspended ceiling grid structures.

At one end of the fixture 10, the feet 36, 46 may include a pivot structure 33 so that the housing may pivot downward for ease of wiring prior to connection of the second end of the hanger bars 30, 40 to the opposite support structure.

In the embodiment of FIG. 1, the hanger bar assemblies 30, 40 are depicted along second and fourth sides 12b, 12d. In this parallel orientation, the hanger bar assemblies 30, 40 extend substantially parallel to the longer dimension of the envelope generally defined by the housing 12 and the junction box 50.

Referring still to FIG. 1, as one of ordinary skill in the art will understand, it is often desirable to maintain the light output aperture 18 (FIG. 3) in its aligned position with one or more other fixtures when mounting light fixtures. However, due to the dimensions of the fixture 10 and the spacing of the supports A, B, the ballast or junction housing 50 may interfere with either of the support structures A, B, when attempting to position the light aperture 18 (FIG. 3) there between. As a further alternative, the close proximity of the ballast or junction housing 50 to the support structures A, B, may inhibit access to the housing 50. For purpose of this description, and with respect to the exemplary embodiment of FIG. 1, the junction box 50 is very close to the ceiling structure A. In prior art junction boxes, the box is generally in a vertical orientation, meaning the doors are positioned substantially vertically in the closed position. When positioned in this vertical orientation, the junction box door would typically open toward the support structure, thus interfering with the structural supports and inhibiting full opening of the junction box. However, in the present embodiment, the junction box 50 is oriented horizontally rather than vertically. Accordingly, the doors open upwardly and downwardly and do not interfere with the support structure A.

Figure 2:
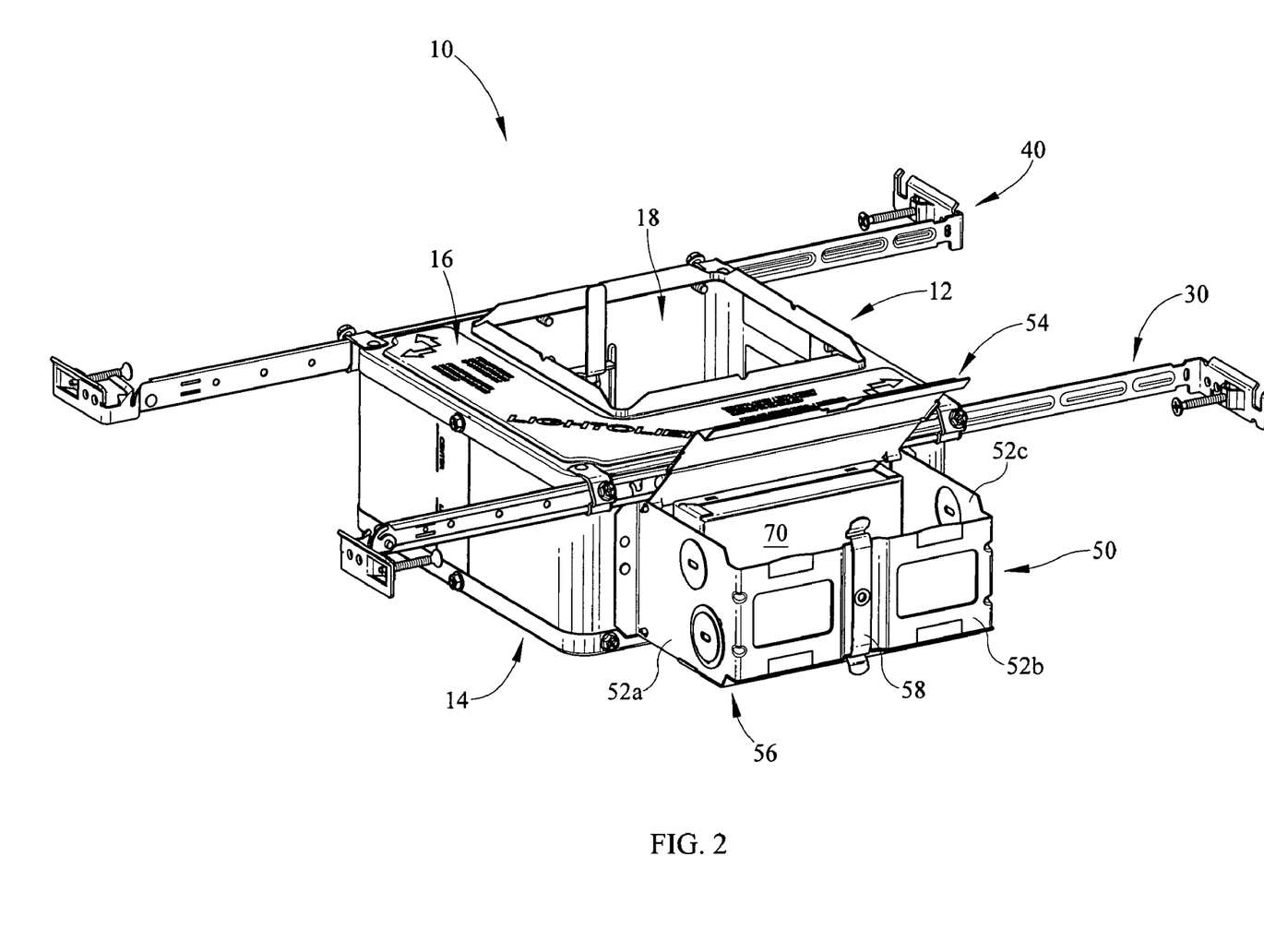
FIG. 2 is a perspective view of the fixture frame-in kit of FIG. 1 in an upside down orientation with the ceiling support structures removed and one junction box door open.

Referring now to FIG. 2, the fixture 10 is depicted in perspective view wherein the fixture 10 is rotated to an upside-down position, so that lower surface 16 and the light aperture 18 are facing upwardly, which is opposite of a typical installation but helpful for description. The lower surface 16 of the housing 12 comprises an aperture 18 for light output. The junction box 50 is connected to a sidewall of the fixture housing 12. As previously described, the fixture housing 12 has four sidewalls, an upper surface 14, which is positioned on the lower side of the embodiment of FIG. 2 due to the rotation of the fixture 10, and a lower surface 16 wherein the light output aperture 18 is positioned. The fixture housing 12 should not be limited, however, to the specific embodiment depicted as various types of housings, frames, frame arms and pans may be utilized with the junction box 50. The junction box has three sidewalls 52a, 52b and 52c. As shown by viewing side 52a, the longer dimension of the side is substantially horizontal, whereas in prior art junction boxes, such corresponding dimension of a junction box 50 is typically vertically oriented. A fourth side joining the sidewalls 52a and 52c will be described later. Along the upper and lower portions of the junction box 50 are first and second pivoting access doors 54, 56. The first pivoting access door 54, is a lower access door which is shown in the open position. When the first access door 54 is in the closed position, it is generally horizontal, hence the horizontal orientation of the junction box 50, and substantially parallel to the lower surface 16. The second pivoting access door 56 is shown in a closed position and is generally in a horizontal orientation and parallel to the upper surface 14. The junction box 50 further comprises a spring clip 58 which locks the first pivoting access door 54 and second pivoting access door 56 in a closed position inhibiting unintentional opening of the doors until the spring clip 58 is bent to clear either of the first and second door 54, 56 to allow for opening.

Referring to FIG. 3, the fixture frame 10 is again shown in an upside-down position with the light output aperture 18 facing upwardly, which is generally opposite to a standard installation. In this configuration, the lower surface 16 of the housing 12 is also facing upwardly and the upper surface 14 is generally facing downwardly. The junction box 50 is depicted with the second pivoting access door 56 facing downwardly and with the access door partially opened. The first pivoting access door 54 is in a closed position with an upper surface generally in a horizontal plane parallel to the lower surface 16. The spring clip 58 is shown retaining the first pivoting access door 54 in the closed position. The spring clip 58 has shoulders defined near ends thereof which extend over the edge of the access doors 54, 56 to retain the doors in a closed position. The spring clip 58 also has gripped tabs 59 adjacent the shoulders so as to bend the clip 58 and clear the edge of the doors 54, 56 allowing opening of either or both doors.

Each of the first and second doors 54, 56 comprises a pivot assembly 60, 66 respectively. The first access door 54 has a corresponding first pivot assembly 60. The pivot assembly includes an aperture 62 in the sidewalls 52a, 52c and a pivoting member 64 extending though the aperture 62 allowing pivoting within the sidewalls 52a and 52c. Similarly, a second pivot assembly 66 allows pivoting motion of the second access door 56 and includes an aperture 68 in the sidewalls 52a, 52c and at least one pivoting member 69. It should be understood that various pivoting assembly designs may be utilized and that the present description is merely exemplary.

Figure 4:
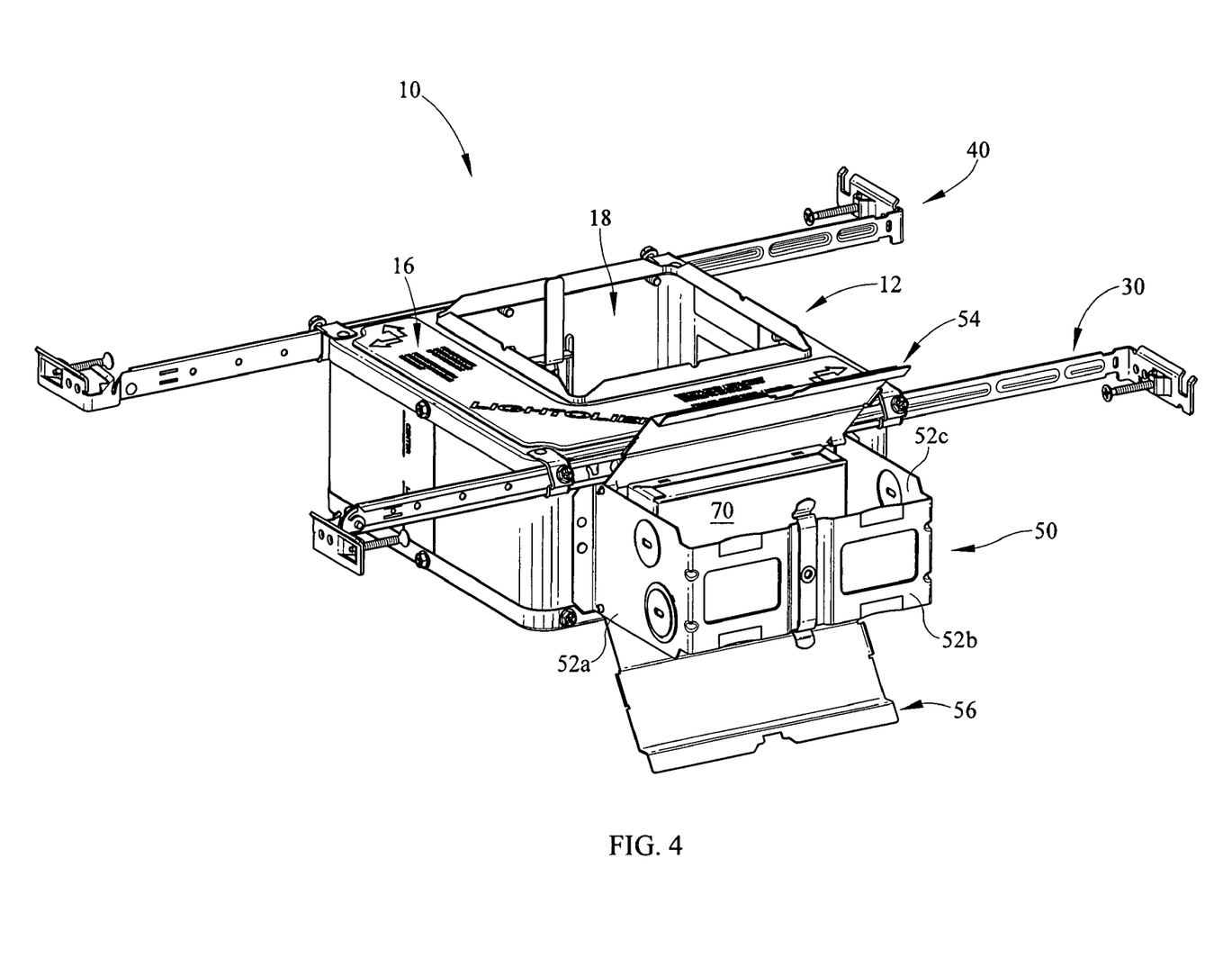
FIG. 4 is a perspective view of the fixture frame-in kit of FIG. 2 with both first and second doors in a partially opened position.
Figure 5:
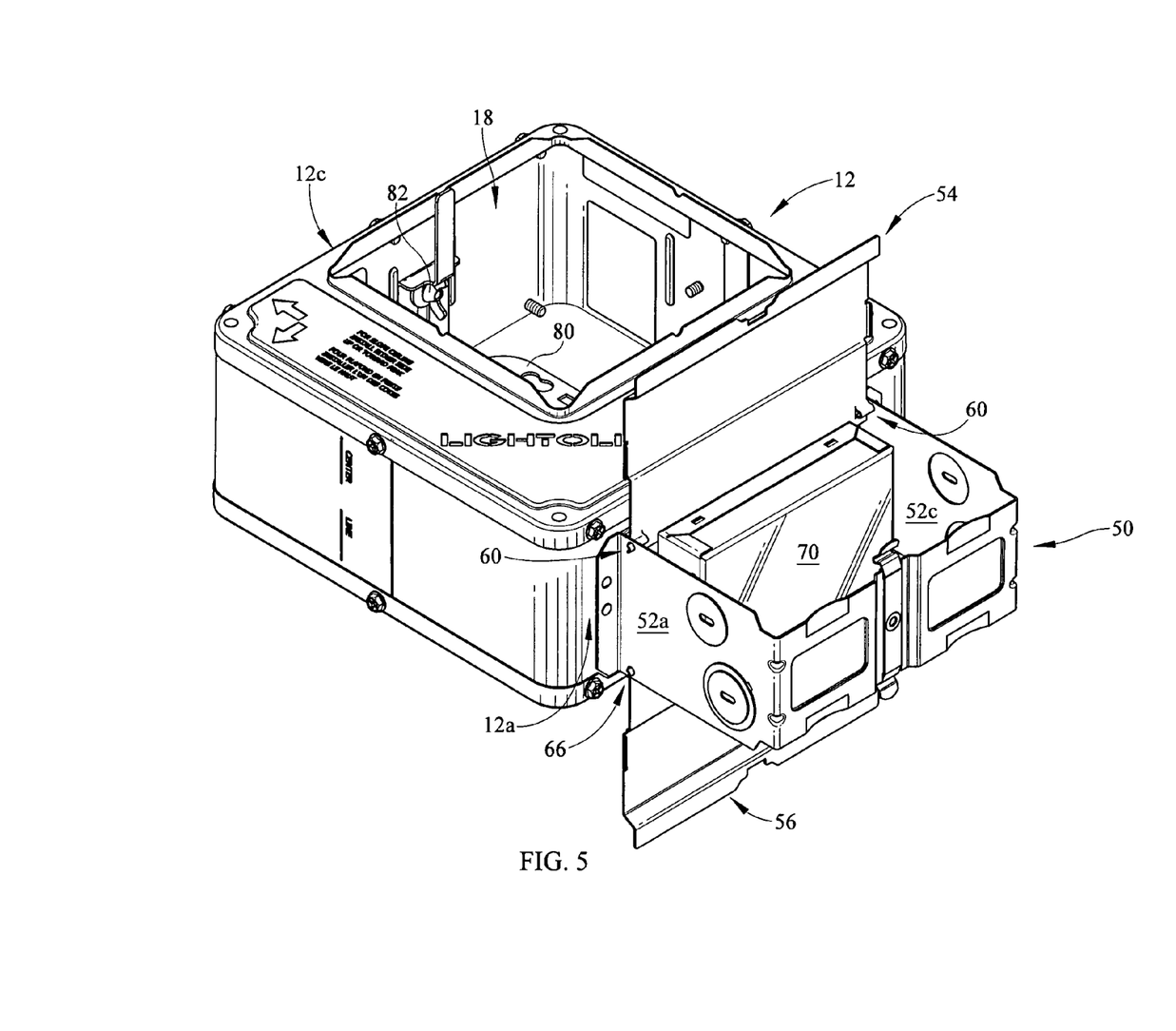
FIG. 5 is a perspective view of the fixture frame-in kit of FIG. 3 with the first and second door in a fully opened position.
Figure 6:
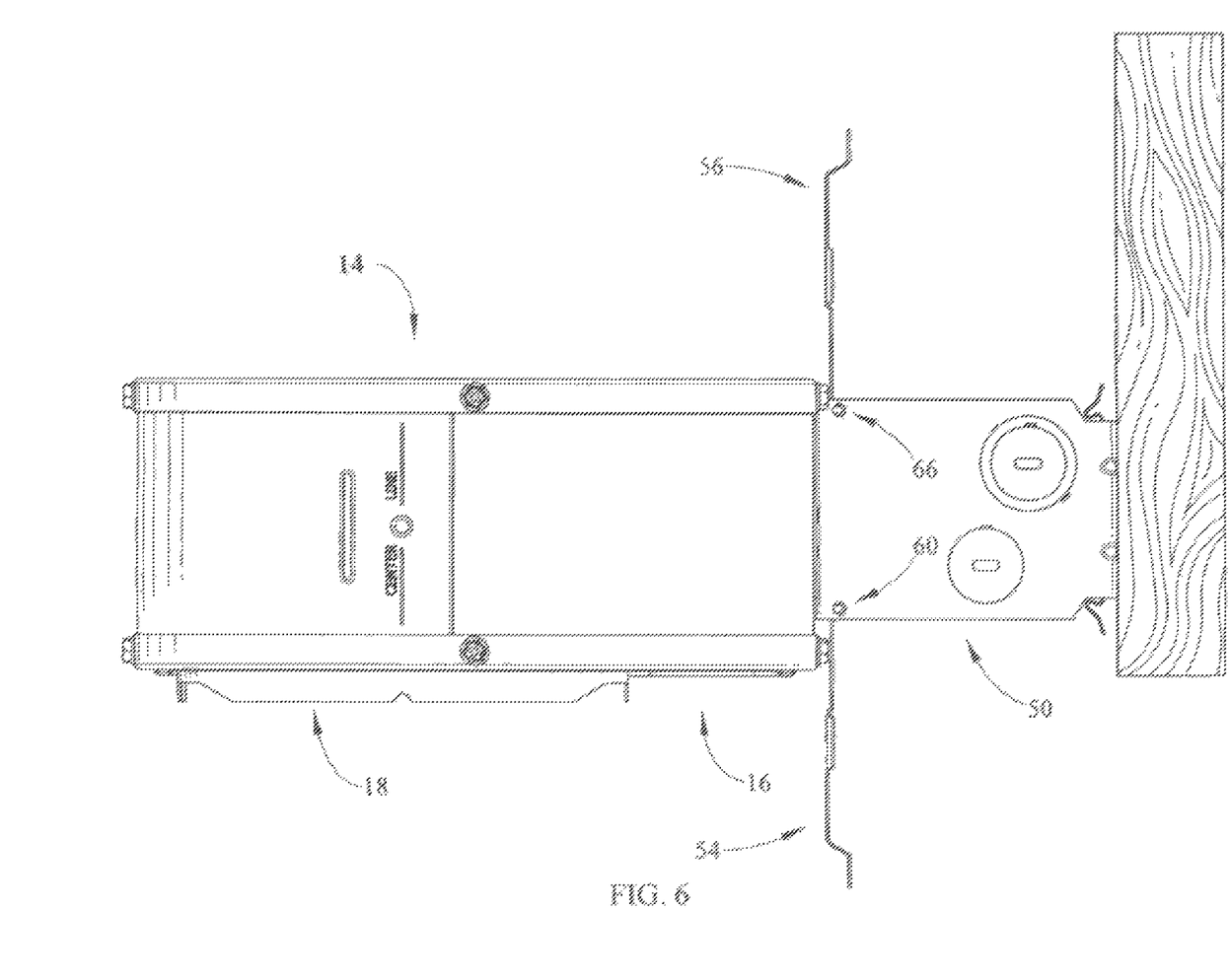
FIG. 6 is a side view of FIG. 5 showing fixture positioned against an exemplary ceiling support structure.

Referring now to FIG. 4, both of the first and second access doors 54, 56 are shown in a partially open position revealing a ballast 70. One of ordinary skill in the art will understand the function of a ballast, and therefore the component will not be described further. Thus the access doors 54,56 may be opened or closed separately or together during installation or maintenance. As shown in FIGS. 5 and 6, the junction box 50 is depicted in perspective view with the doors 54, 56 shown in the fully open position. In FIG. 5, the first and second pivot or hinge assemblies 60, 66 are clearly shown. Various alternative hinge assemblies may be utilized in order to allow pivoting motion between the first and second doors 54, 56 and the junction box sidewalls 52a, 52c.

Also depicted in FIG. 5 is a bracket 80. The bracket 80 is fastened by wing nut or other fastener 82 within the housing 12. The bracket 80 generally extends across the housing 50 from one side 12c to the opposite side 12a, adjacent the ballast 70 (FIG. 2), as will be described further herein. The bracket 80 functions to adjust the position of the lamp socket (not shown) within the fixture housing 12. Specifically, when the housing 12 is mounted in the position shown in FIG. 1, the bracket 80 is slidable vertically within the housing 12 to adjust the position of the lamp (not shown) relative to the downlight aperture 18.

Referring again briefly to FIG. 6, the doors 54, 56 are open and in the vertical orientation. When closed, the doors 54, 56 are substantially horizontally oriented. The horizontal orientation of the junction box 50 allows opening of the doors 54, 56 when positioned adjacent a ceiling support or other in ceiling structure. Also, after installation and during inspection, the upper side 14 and door 56 may be covered with insulation. However, the lower door 54 is openable without moving the fixture housing 12 away from the ceiling supports A,B (FIG. 1). Therefore, the position and alignment of the aperture 18 is maintained with respect to the arrangement of light fixtures in a room without limiting access to the junction box 50 after installation of the fixture housing 12 between support members A, B.

Figure 7:
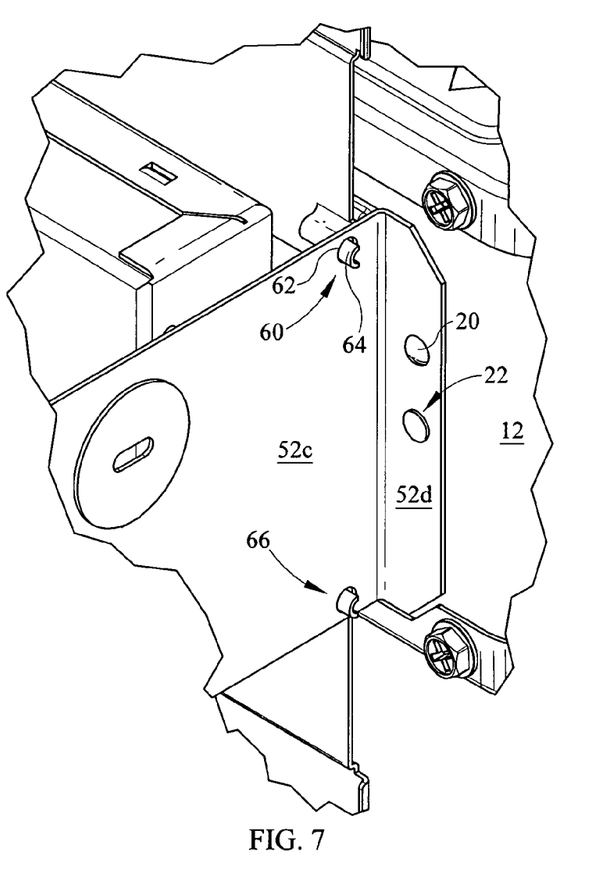
FIG. 7 is a detail view of an exemplary connection between the fixture frame and the junction box.
Figure 9:
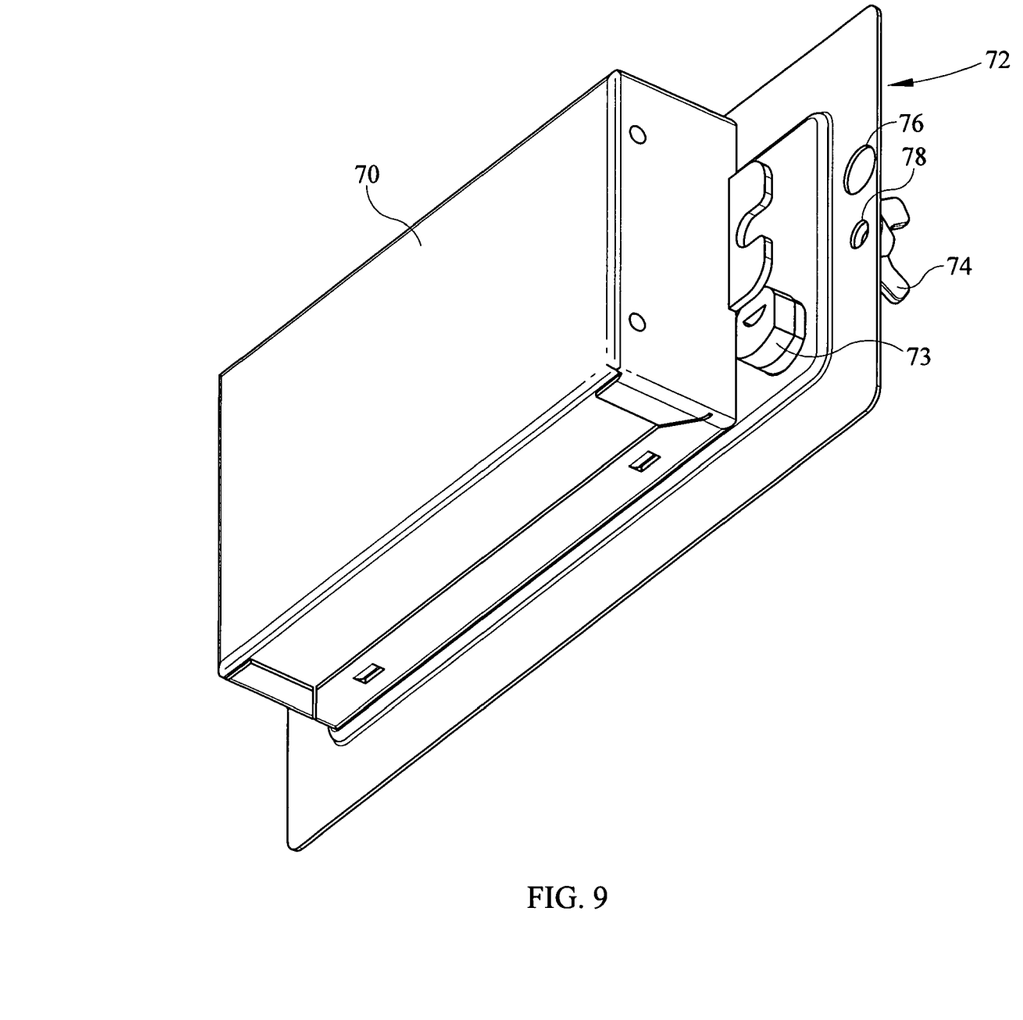
FIG. 9 is a perspective view of an internal wall of the junction box for separating the junction box from the interior of the fixture frame housing.
Figure 10:
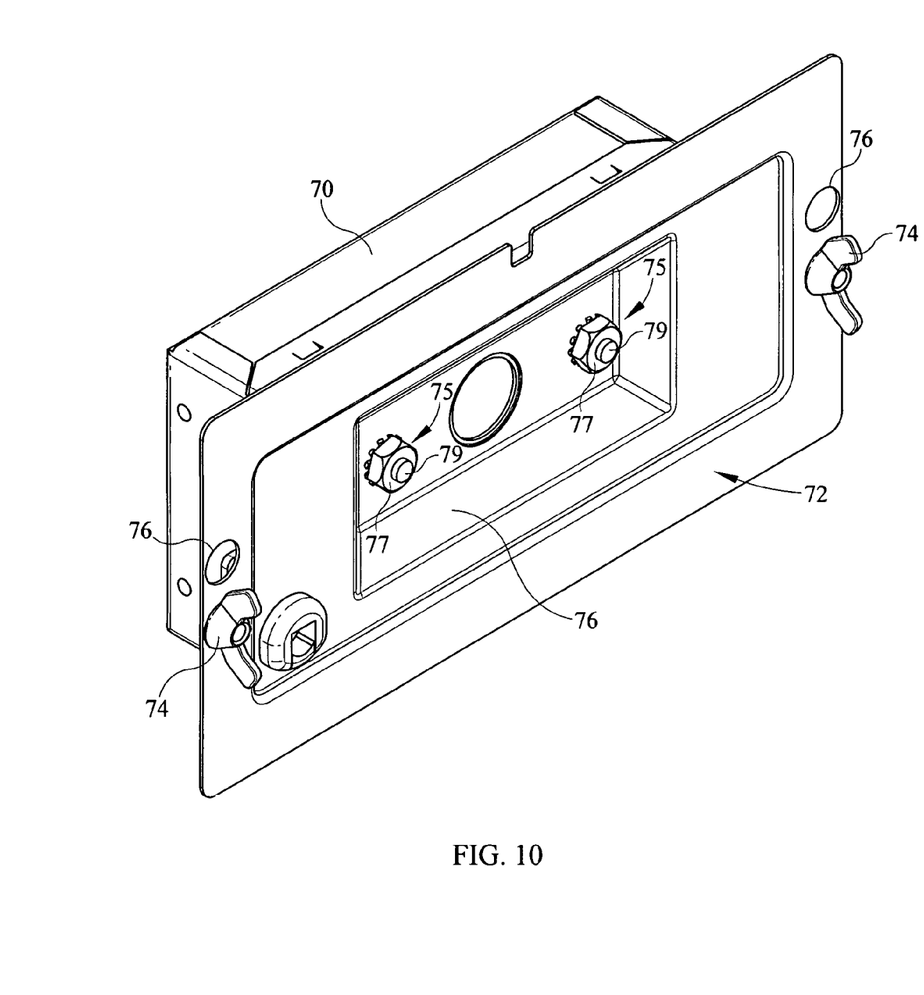
FIG. 10 is a perspective view of the internal wall of FIG. 9.

Referring now to FIG. 7, a perspective detailed view of sidewall 52c is depicted. The sidewall 52c has a foot 52d which is seated on the housing 12 and fastened thereto. The opposite sidewall 52a (not shown) also includes a foot 52d which is fastened to the housing 12. Various structures or configurations may be used to connect the junction box 50 to the fixture 12, as long as the connection is approved or meets electrical code regulations for junction boxes. In the exemplary embodiment, an upper rivet 20 connects the housing 12 and the foot 52d. A lower fastener 22 extends though the foot 52d, through the housing 12 and through a plate 72 (FIGS. 9 and 10). The plate 72 will be described further herein.

FIG. 7 also depicts the exemplary hinge assembly 60 wherein the member 64 extends through aperture 62 in the sidewall. The exemplary hinge assembly 66 operates in the same manner.

Figure 8:
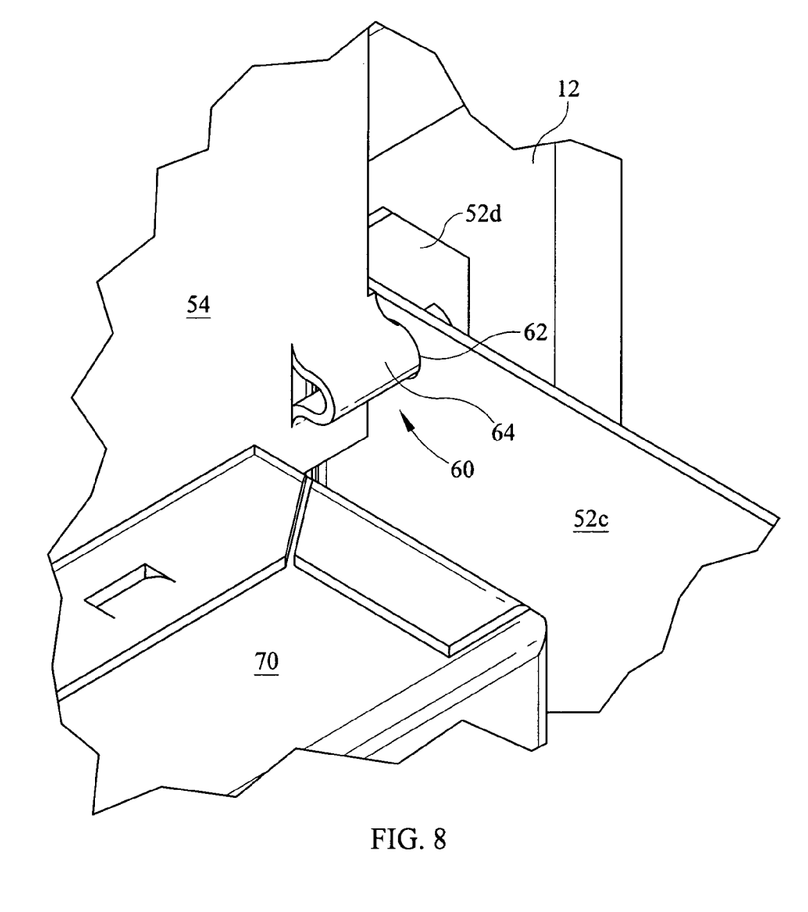
FIG. 8 is a detail view of an exemplary hinge assembly for connecting the junction box doors to the junction box sidewall.

Referring now to FIG. 8, the exemplary hinge assembly 60 is depicted from the interior side of wall 52c. A pivoting member 64 is mounted along an edge of the first door 54. The aperture 62 is clearly shown in the sidewall 52c through which the member 64 passes. The pivoting member 64 is formed integrally with the door 54.

Referring now to FIG. 9, the junction box access plate 72 is depicted. The fixture 10 is enclosed upon installation of ceiling material, such as in a fixed ceiling system, so that the only access to the junction box 50 is through the aperture 18. The access plate 72 allows access to the ballast 70 and junction box 50 from within the housing 12 after the ceiling is in place. The ballast 70 is connected to the access plate 72 for proper operation of the fixture 10. As previously described, after the fixture 10 is installed and the ceiling material is positioned over the ceiling structures A, B (FIG. 1) and hides the fixture 10, the only access to the junction box 50 is through the light output aperture 18. In order to replace or maintain a ballast 70, or other electrical component, or to check wiring connections within the junction box 50, a maintenance person may access the junction box 50 through the light output aperture 18 and remove the access plate 72 which allows removal of the ballast 70. This assembly must be pulled through the fixture housing 12 and out through the aperture 18. In order to remove the access plate 72, a plate fastener, such as the exemplary fastener 74 which is connected to threaded fastener 22 (FIG. 7) is loosened whereby the plate 72 may be removed. The plate 72 includes one aperture 76 which allows for seating of a head of fastener 20 (FIG. 7) between plate 72 and housing sidewall 12a (FIG. 1). Thus the aperture 76 functions as a relief and limits or inhibits bending of the plate 72. The second aperture 78 includes allows for passage of fastener 22 there through. The exemplary wing-nut fastener 74 allows easy removal of the plate from the side wall 12a. Alternatively, other types of fastening devices may be utilized. The figure also depicts a wireway 73 allowing passage of wiring from within the junction box 50 to the interior of the housing 12.

Alternatively, the maintenance person may access the junction box 50 in a second manner. That is, if access to the fixture is available from above, such as through an attic, the maintenance person may open the upper junction box door to gain access to the wiring or electrical component therein.

Referring now to FIG. 10, the access plate 72 is shown in perspective view from the opposite side of FIG. 9. The plate 72 includes an embossment or cavity formed therein having first and second fastening apertures generally at 75 to which the ballast 70 may be connected. The ballast 70 includes first and second fasteners 79 extending through aperture 75. The threaded fasteners are held in place by locking nuts 77. Thus, when the fasteners 74 are accessed through the light output aperture 18 in the fixture housing 12, the plate 72 may be removed with the ballast 70 through the aperture 18 for replacement or maintenance.

Figure 11:
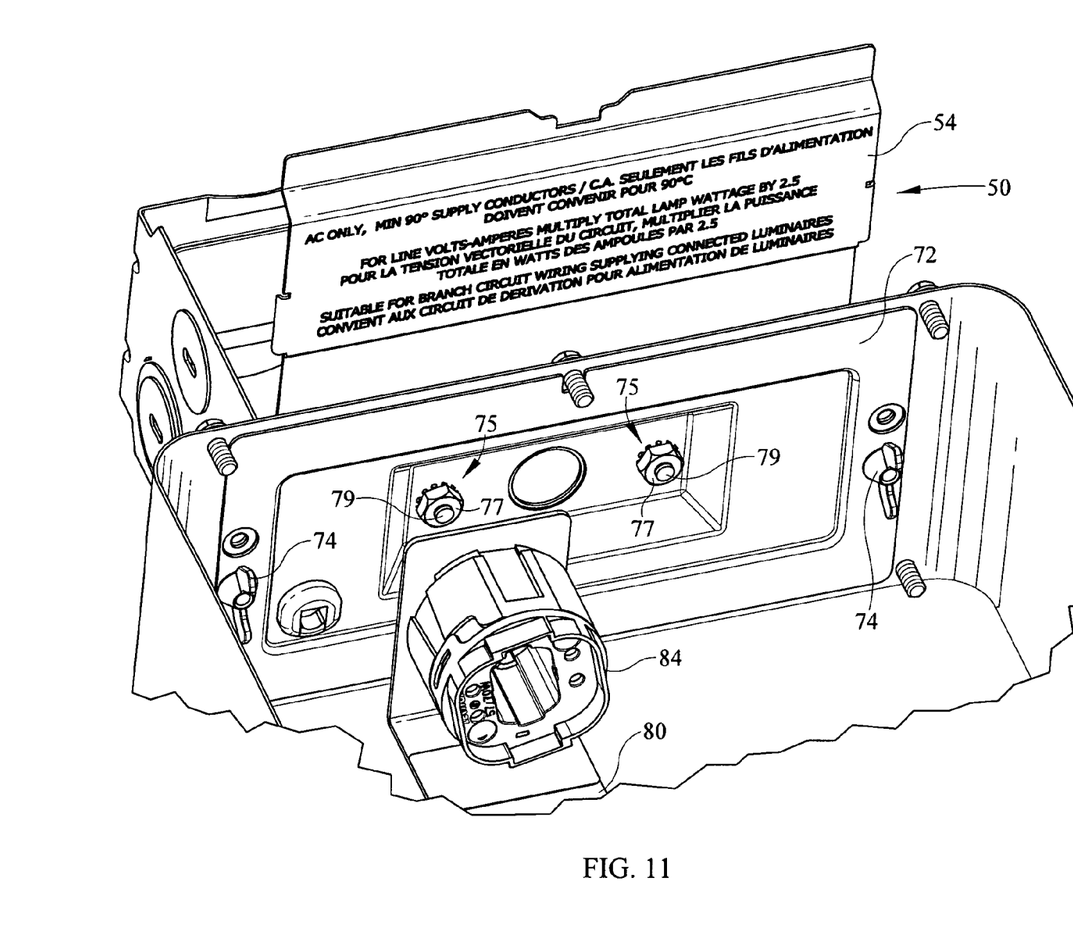
FIG. 11 is a perspective view of the interior of the fixture frame housing viewing toward the interior plate of FIG. 10.

Referring now to FIG. 11, a perspective view of the housing 12 is shown with the lower surface 16 removed to show the bracket 80 positioned therein. The bracket 80, as previously described, extends across the upper surface 14 of the housing 12. The bracket 80 comprises a lamp socket 84 connected thereto to which a lamp (not shown) may be connected as well. As previously described, the bracket 80 provides some amount of adjustment for the socket 84. The bracket 80 may also be loosened and removed when the plate fastener 74 is unfastened so as to remove plate 72. Once the plate 72 is removed, the open side of the junction box 50 is accessible wherein a maintenance person may access wiring connections and/or replace a ballast on the plate 72 and reposition the plate 72 and ballast into the junction box 50.

Figure 12:
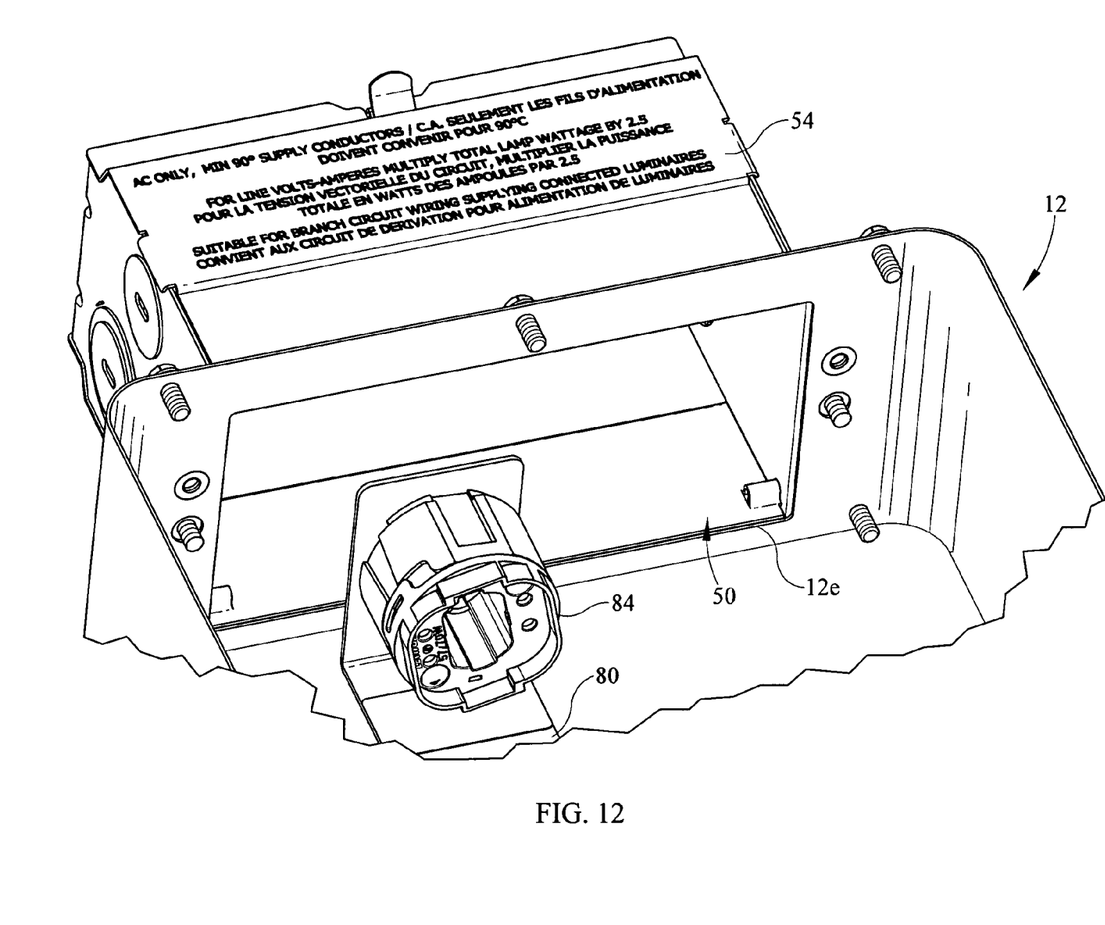
FIG. 12 is a perspective view of the interior of the fixture frame housing with the inner door removed to show the interior of the junction with ballast removed.

As shown in FIG. 12, the plate 72 is removed and the interior portion of the junction box 50 may be accessed. The locking nuts 77 are removed so that the plate 72 may be removed. When the plate 72 is removed, the ballast or other electrical component may also be removed. The junction box 50 is accessible through an aperture 12e in the fixture housing sidewall 12a.

In operation, the lighting fixture 10 is connected between ceiling support members A, B and wiring connections may be made between a power supply and the ballast 70, as well as the lamp socket 84, if such is not performed during manufacture. Once these connections are made, and prior to, placement of the ceiling material, an inspector may choose to inspect the junction box contents 50 for proper wiring standards, transformer, ballast, LED driver or electrical work. Under normal circumstances, at this point in the construction process, the fixture 10 will be at least surrounded by insulation and may further be in contact with or nearly in contact with a ceiling support member A, B or HVAC ducting, or electrical trays or plumbing or other hidden structures generally located in a building ceiling area. However, in order for the inspector to inspect the interior connections of the junction box, and due to the horizontal orientation of the junction box 50, the inspector need only open the downwardly facing access door 56 without disturbing the positioning of the fixture 10 relative to the ceiling supports and other existing light structures. Thus, the fixture pattern and alignment in the room is not disturbed once it is properly set. After inspection, the junction box access door 56 may be returned to a closed position and the ceiling material installed. After this installation, should an installer or maintenance person need access to the junction box 50, the junction box 50 is accessed through the light output aperture 18 by loosening fasteners and removing the interior access plate 72, or alternatively may access the junction box 50 through the upper junction box door if access through an attic or from above the fixture 10 is available.

The foregoing description of structures and methods has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A recessed fixture having a junction box positioned adjacent at least one ceiling support structure, comprising:
   a fixture housing;
   said junction box mounted to said fixture housing, said junction box being horizontally oriented;
   said junction box having a first junction box door and a second junction box door;
   said first junction box door and said second junction box door being oppositely positioned and pivotally connected to a junction box housing, said first and second junction doors being in a substantially horizontal orientation in a closed position;
   one of said first junction box door and said second junction box door facing substantially upwardly and the other of said first junction box door and said second junction box door facing substantially downwardly;
   wherein said horizontal orientation allows said junction box doors to be positioned adjacent a ceiling structure without limiting opening of said junction box doors.

2. The recessed fixture of claim 1, said first junction box door having a first pivoting axis extending horizontally.

3. The recessed fixture of claim 2, said second junction box door having a second pivoting axis extending in a direction substantially parallel to said first pivoting axis.

4. The recessed fixture of claim 1, said junction box housing having a sidewall disposed between said first and second junction box doors and adjacent said at least one ceiling support structure.

5. The recessed fixture of claim 4, said sidewall disposed between said first and second junction box doors and adjacent said at least one ceiling support structure being a substantially vertical sidewall.

6. The recessed fixture of claim 1, said junction box doors being openable without requiring movement of said fixture relative to said at least one ceiling support structure.

7. A recessed fixture having a fixture housing and a junction box, comprising:
   said fixture housing having a light output aperture;
   said junction box mounted to said fixture housing;
   a first access door pivotally mounted on said junction box in a first substantially horizontal plane;
   a second access door pivotally mounted to said junction box, said second access door positioned opposite said first access door in a second substantially horizontal plane;
   said first and second substantially horizontal planes being substantially parallel to a plane of said light output aperture;
   said junction box being positioned adjacent a ceiling support structure;
   said first access door and said second access door being openable when said junction box is positioned immediately adjacent said ceiling support structure and without moving said recessed fixture.

8. The recessed fixture of claim 7, said first and second access doors being pivotable about a horizontal axis.

9. The recessed fixture of claim 7 further comprising an access plate fastened to said junction box.

10. The recessed fixture of claim 9, said access plate providing access to said junction box internally from said fixture housing.

11. The recessed fixture of claim 9 further comprising an electrical component mounted to said access plate.

12. The recessed fixture of claim 7 further comprising a clip for retaining said first and second access doors in a closed position.

13. The recessed fixture of claim 7 further comprising a plate covering an aperture between said junction box and said fixture housing.

14. The recessed fixture of claim 13 further comprising an electrical component connected to said plate.

15. A recessed fixture assembly having a fixture housing and a junction box, said recessed fixture assembly comprising:
- said junction box extending from a sidewall of said fixture housing;
- at least one opening disposed between said junction box and said fixture housing;
- said opening allowing interior access to said junction box through said fixture housing;
- a first pivoting door and a second pivoting door oppositely positioned on said junction box and horizontally oriented in a closed position;
- said junction box being horizontally oriented so that said junction box doors are accessible when said junction box is positioned adjacent a ceiling support member.

16. The recessed fixture assembly of claim 15, further comprising pivot apertures in vertically oriented junction box sidewalls.

17. The recessed fixture assembly of claim 15, said recessed fixture assembly being an enclosed fixture.

18. The recessed fixture assembly of claim 15 further comprising a plate covering said opening allowing interior access to said junction box.

19. The recessed fixture assembly of claim 15 further comprising an electrical component connected to said plate, said electrical component positioned within an interior of said junction box.

* * * * *